United States Patent [19]

Fried et al.

[11] 4,166,890
[45] Sep. 4, 1979

[54] MANUFACTURE OF CROSSLINKED FOAMABLE MOLDINGS FROM OLEFIN POLYMERS

[75] Inventors: Michael Fried, Heidelberg; Ludwig Zuern, Bad Duerkheim; Erhard Stahnecker, Heidelberg, all of Fed. Rep. of Germany

[73] Assignee: BASF Aktiengesellschaft, Fed. Rep. of Germany

[21] Appl. No.: 885,770

[22] Filed: Mar. 13, 1978

[30] Foreign Application Priority Data

Apr. 2, 1977 [DE] Fed. Rep. of Germany ....... 2714800

[51] Int. Cl.$^2$ .............................................. C08V 9/10
[52] U.S. Cl. ........................................ 521/92; 521/93; 521/95; 521/96; 521/123; 521/124; 521/125; 521/140; 521/143; 521/144; 521/909
[58] Field of Search ................ 260/2.5 HA; 521/134, 521/140, 143, 144

[56] References Cited

U.S. PATENT DOCUMENTS

| 3,470,119 | 9/1969 | Benning et al. | 260/2.5 HA |
| 3,658,730 | 4/1972 | Takahashi et al. | 260/2.5 HA |
| 3,717,559 | 2/1973 | Oyama et al. | 260/2.5 HA |
| 3,818,086 | 6/1974 | Stastny et al. | 260/2.5 HA |
| 3,950,278 | 4/1976 | Wada et al. | 260/2.5 HA |
| 3,965,054 | 6/1976 | Nojiri et al. | 260/2.5 HA |

*Primary Examiner*—Morton Foelak
*Attorney, Agent, or Firm*—Keil & Witherspoon

[57] ABSTRACT

A process for the manufacture of cross-linked foamable moldings from olefin polymers, wherein the olefin polymer is mixed with
(a) a solid organic blowing agent which eliminates gases when heated,
(b) an organic peroxide,
(c) conventional additives and
(d) an activating organic compound which lowers the decomposition temperature of the peroxide, and the mixture is molded thermoplastically and is crosslinked below the decomposition temperature of the blowing agent but above the decomposition temperature of the activated peroxide.

The organic activator is preferably a transition metal salt of a long-chain fatty acid.

The moldings may be used for the manufacture of foams, for example for insulating purposes.

17 Claims, No Drawings

MANUFACTURE OF CROSSLINKED FOAMABLE MOLDINGS FROM OLEFIN POLYMERS

The present invention relates to a process for the manufacture of crosslinked, foamable moldings from olefin polymers by mixing a thermoplastic olefin polymer with a solid organic blowing agent, an organic peroxide and an activating compound, molding this mixture and crosslinking the molding. The invention further relates to the use of the moldings for the manufacture of foams.

When manufacturing polyolefin foams of low density, it is in general necessary to crosslink the thermoplastic resin prior to, or simultaneously with, the expansion stage. Crosslinking in that case serves to improve the visco-elastic properties of the resin and thus provides the preconditions for the formation of a foam structure which is stable at the foaming temperature.

German Published Application DAS No. 1,694,130 discloses a process for the manufacture of polyolefin foams in which a solid organic blowing agent and an organic peroxide are incorporated into the thermoplastic resin, after which the composition is heated to a temperature at which the peroxide and the blowing agent decompose and a crosslinked foamed article is formed. The peroxide must be carefully matched to the blowing agent in order to ensure that the latter does not decompose before the former. This is because, if the blowing agent decomposes, and hence gas is formed, before the polyolefin is adequately crosslinked, the resulting foam collapses. Even if suitable peroxide/blowing agent combinations are used, careful control of the processing temperature and processing conditions is necessary. Nevertheless, in this simultaneous crosslinking and foaming process the formation of gas bubbles during crosslinking cannot be entirely suppressed and there are always obtained foams having relatively coarse cells. Furthermore, the finished foams frequently exhibit a yellowish to brownish surface discoloration. These difficulties cannot be circumvented by employing peroxides having an extremely low decomposition temperature because, if such peroxides are used, crosslinking already occurs when they are admixed to the polyolefin melt, and the mixture is therefore no longer thermoplastically moldable. If attempts are made to shorten the duration of mixing, so that the peroxide is only briefly exposed to the processing temperature, the peroxide is not dispersed homogeneously enough in the polyolefin and the foams ultimately obtained do not exhibit the desired uniformly fine cell structure.

These disadvantages are not encountered if the crosslinking of the polyolefin mixture containing blowing agent, and the foaming of the mixture, are carried out in separate process steps.

German Published Application DAS No. 1,947,589 describes a process of the above type, in which an organic, solid blowing agent is homogeneously incorporated into an olefin polymer and the mixture is molded to give sheets which are then crosslinked by means of ionizing radiation, for example high-speed electrons. The sheets which have been crosslinked in this way can be foamed, in a separate process step, by decomposing the blowing agent through the supply of energy, and foam webs which have a uniformly fine cell structure and are substantially free from discoloration are obtained. However, the ionizing radiation sources required for such processes are expensive and frequently prone to break down. A particular disadvantage of such crosslinking equipment is that installations which operate with economical yields produce ionizing radiation having a very limited depth of penetration and hence foams which are more than about 5 mm thick can, on present experience, not be manufactured.

It is an object of the present invention to provide a simple process, which is trouble-free to perform, for the manufacture of foamable polyolefin moldings which can be foamed to give foams having a uniformly fine cell structure and a thickness of up to 40 mm.

We have found that this object is achieved, according to the invention, by lowering the decomposition temperature of the peroxide by adding an activating organic compound. A plurality of attempts to influence the rate of decomposition by means of an activating additive has already been made without, however, having given the desired result (c.f. Vieweg, "Polyolefine", volume IV of the Kunststoff-Handbuch, published by Carl-Hanser-Verlag, page 166).

Accordingly, the present invention relates to a process for the manufacture of crosslinked, foamable moldings from olefin polymers by A. mixing a thermoplastic olefin polymer with
 (a) from 1 to 20% by weight, based on the olefin polymer, of a solid organic blowing agent which eliminates an inorganic gas on heating, and
 (b) from 0.25 to 5% by weight, based on the olefin polymer, of an organic peroxide having a half-life temperature above 90° C., with or without
 (c) from 0.1 to 5% by weight, based on the olefin polymer, of a foaming assistant, crosslinking promoter and other conventional additives, and with
 (d) from 0.00001 to 1% by weight, based on the olefin polymer, of an activating organic compound, which lowers the decomposition temperature of the peroxide,
at above the softening point of the olefin polymer but below the decomposition temperature of the blowing agent and peroxide, B. converting the mixture, in the thermoplastic state, to the desired shape, and C. crosslinking the mixture at below the decomposition temperature of the blowing agent, but above the decomposition temperature of the activated peroxide.

The moldings manufactured in this way can then be cooled and can, at any desired subsequent point in time, be heated to above the decomposition temperature of the blowing agent, whereby a uniformly fine-celled foam which is stable at the foaming temperature is obtained.

For the purpose of the present invention, decomposition temperature of the peroxide means the temperature at which the decomposition of the peroxide is just sufficiently pronounced that the peroxide causes appreciable crosslinking of the olefin polymer (detectable from a change in the rheological properties) during the processing time.

The olefin polymers suitable for the process according to the invention include high pressure, medium pressure and low pressure polyethylene, polypropylene, polybutene, copolymers of ethylene with up to 50% by weight of propylene, 1-butene, butadiene, vinyl acetate or acrylates, and mixtures of two or more of these polymers, as well as mixtures of polyolefins with up to 40% by weight of polymers which, because of containing unsaturated main chains or side chains, are particularly capable of undergoing crosslinking reactions, e.g. 1,4- polybutadiene, 1,2-polybutadiene, natural rubber, polyisoprene and styrene/butadiene copolymers. The use of polyethylene is preferred.

Preferred organic, normally solid, blowing agents which eliminate inorganic gases on heating are those which have a decomposition temperature above 160° C. and especially above 180° C. Examples of suitable materials are: nitroso compounds, e.g. dinitrosopentamethylenetetramine (decomposition temperature Z about 200° C.); hydrazides, e.g. benzene-1,3-disulfonyl-dihydrazide (Z=150°), diphenylsulfone-3,3'-disulfonylhydrazide (Z=150°), p,p'-oxy-bis-benzenesulfonyl-hydrazide (Z=160°), β-naphthalenesulfonyl-hydrazide (Z=170°) and benzenesulfonyl-N-phenylhydrazide (Z=150°), as well as p,p'-oxy-bis-benzenesulfonylsemicarbazide (Z=140°) and diphenyl-4,4'-disulfonylazide (Z=140°).

However, for economic reasons azodicarboxamide (Z=190°) is preferred. The amount of blowing agent employed depends on the desired degree of foaming and is from 1 to 20% by weight, preferably from 5 to 15% by weight, based on the olefin polymer. To achieve special effects it is also possible to employ a mixture of two or more blowing agents.

The gas formation characteristics and the decomposition temperature of the blowing agent can be varied within wide limits by adding certain foaming assistants, e.g. metal oxides, fatty acid salts or sulfides or oxides of zinc, lead, cadmium or tin. Free fatty acids, e.g. stearic acid, have a similar effect. Depending on the desired decomposition temperature, from 0.1 to 5% by weight, based on the olefin polymer, of the said compounds may be added. In a preferred embodiment, from 0.5 to 3% by weight of zinc oxide or zinc stearate is added.

Suitable crosslinking agents are peroxides which have a half-life temperature above 90° C., so that no appreciable decomposition of the peroxide occurs on processing the latter together with the olefin polymer in conventional industrial mixing equipment. The half-life temperature is defined as the temperature at which half the peroxide decomposes in 1 hour, and is preferably from 95° to 150° C. Examples of suitable conventional peroxides are: tert.-butyl permaleate (half-life temperature =105°), 2,5-dimethylhexane-2,5-diperbenzoate (119°), tert.-butyl peracetate (120°), tert.-butyl perisononate (122°), di-tert.-butyl diperphthalate (122°), tert.-butyl perbenzoate (125°), 2,5-dimethylhexane-2,5-diperisononate, tert.-butyl per-3,5,5-trimethylhexanoate (122°), 2,2-bis-(butylperoxy)-butane (125°), dicumyl peroxide (134°), tert.-butyl cumyl peroxide, 2,5-dimethyl-2,5-bis-(tert.-butylperoxy)-hexane (137°), 2,5-dimethyl-2,5-bis-(tert.-butylperoxy)-hexyne (149°), 1,3-bis-(tert.-butylperoxyisopropyl)-benzene, di-tert.-butyl peroxide (146°), tert.-butyl hydroperoxide (140°), cumene hydroperoxide (147°), methyl ethyl ketone peroxide (135°), acetylacetone peroxide (125°), cyclohexanone peroxide (120°) and 3,5,5-trimethyl-cyclohexanone perketal (130°).

The most suitable peroxide for each individual case depends on the nature of the olefine polymer employed and the nature of the activator added in accordance with the invention. The amount of peroxide added is from 0.25 to 5% by weight, preferably from 0.75 to 2.5% by weight, based on the polymer.

The crosslinking effect can be boosted by adding a crosslinking promoter to the mixture of olefin polymer and blowing agent before the peroxide is added. For the purposes of the invention, a cross-linking promoter is an organic compound which contains two or more olefinically unsaturated double bonds which directly participate in the formation of bridges between the high molecular weight polyolefin chains. Examples of effective promoters are diallyl phthalate, maleate and fumarate, triallyl isocyanurate and phosphate, divinylbenzene, ethylene glycol diacrylate and dimethacrylate, and trimethylolpropane trimethacrylate. Such crosslinking promoters display their optimum effectiveness when used in amounts of from 0.2 to 5% by weight, but concentrations of from 1 to 3% by weight, based on the olefin polymer, are preferred.

Suitable activating organic compounds are, in particular, salts of long-chain aromatic or aliphatic fatty acids having at least 7 carbon atoms and metals of sub-groups 1 to 8 of the periodic table. Some typical examples of this category of compounds are given below: copper-II stearate, oleate, ricinoleate, linoleate, palmitate, laurate, versatate, octoate and naphthenate, vanadium-III naphthenate, chrominium-III stearate, versatate, octoate, oleate, naphthenate and sebacate, manganese-II stearate, palmitate, versatate, octoate, oleate, linoleate and naphthenate, iron-II and iron-III stearate, palmitate, octoate, oleate, adipate and sebacate, cobalt-II and cobalt-III stearate, versatate, octoate, oleate, linoleate, ricinoleate, naphthenate and benzoate and nickel-II stearate, octoate, naphthenate, versatate, oleate, linoleate and ricinoleate.

The nature and required amount of activator depends on the nature of the peroxide with which it is combined. The amount required for adequate crosslinking may be from 0.00001 to 1% by weight, but is in most cases from 0.0001 to 0.01% by weight, based on the olefin polymer.

Because of the very low concentration of the activator, it has proved advantageous to convert the metal salts, which in most cases are in the form of solid crystals, into a dilute mixture with inert, finely divided fillers, e.g. silica gel or calcium carbonate, and to measure out the amount of activator in this form. Where the metal salts are soluble in solvents which are free from protons and from hydroxyl groups, they can also be successfully measured out in the form of a dilute solution. Preferred solvents for this purpose are aliphatic hydrocarbons.

The properties of the foams obtained can be modified as desired by incorporation of other conventional additives, e.g. antioxidants, anti-ozone compounds, light stabilizers, flame-proofing agents or other conventional polymer auxiliaries. In carrying out the process according to the invention, it is advantageous first to mix the olefin polymer and blowing agent, with or without foaming assistants, crosslinking promoters and other additives. One of the two components of the crosslinking system is then added to this mixture, it being immaterial which of the two components is added first. In general, however, the component which is most difficult to disperse homogeneously in the thermoplastic will be added first. For example, when using a liquid peroxide, e.g. tert.-butyl perbenzoate, and a solid activator, e.g. copper stearate, it is preferred to add the crystalline copper salt first, in order to ensure that the activator will be sufficiently homogeneously dispersed. Conversely, when using a crystalline peroxide, e.g. cumene peroxide, or a peroxide which is sold commercially in combination with a vehicle, e.g. 1,3-di-tert.-butylperoxyisopropyl-benzene, it is advantageous first to incorporate the peroxide.

Preferably, however, at least one of the two components should be homogeneously incorporated in the olefin polymer, since the desired uniformly fine cell structure of the foam depends thereon. The other component is only added to the mixture shortly before the next process step, i.e. before molding, and mixing need no longer be as homogeneous as in the case of the first component. When both crosslinking components have been added, the crosslinking reaction is initiated. The nature and amount of the peroxide and of the activator, and the temperature, should advantageously be matched so that the interval between adding the second component and the instant at which the crosslinking has progressed sufficiently far that thermoplastic molding is no longer possible (i.e. the pot life) is sufficiently long to leave time for fairly thorough admixture of the second crosslinking component and for molding of the thermoplastic mixture. Preferably, this pot life should be from about 1 to 20 minutes, more especially from 2 to 10 minutes.

The mixing process may be carried out by any device suitable for homogenizing a thermoplastic. However, it has been found that machines which expose the thermoplastic to high shearing stresses frequently may cause premature decomposition of the blowing agent. Processing devices which permit gentle treatment of the material to be kneaded are therefore preferred. The machinery employed may operate either continuously or batchwise. For example, internal mixers and kneaders with sigma blades have proved very suitable. However, extruders are also very appropriate for carrying out the process continuously. In this case, it is possible to employ either a single extruder with two intake orifices for the two components of the crosslinking system, or a combination of two extruders run in parallel. In the latter case, the mixture containing blowing agent is charged into each of the two extruders, with one of the crosslinking components in one extruder and the other component in the other extruder, and each mixture is homogenized. The separate product streams are only combined immediately before reaching the extrusion die which molds the final product, and are thus mixed and then molded. The temperature during mixing should be above the softening point of the olefin polymer but below the decomposition temperature of the blowing agent and of the nonactivated peroxide. Preferably, it should be from 110° to 150° C., especially from 125° to 140° C.

Immediately after the components have been mixed, the mixture is thermoplastically molded to the desired shape. This molding takes place within the same temperature range as the mixing, and should be carried out very rapidly so that the crosslinking cannot proceed too far. The molding time should therefore be less than the pot life, i.e. preferably from 0.5 to 20 minutes, more especially from 1 to 10 minutes. Molding may be carried out on conventional machinery, for example on platen presses or calenders, or by extrusion through dies, especially sheet dies. Sheets, films or strands which have a thickness of from about 0.8 to 10 mm are thus produced.

The activated moldings are crosslinked by further heating to above the decomposition temperature of the activated peroxide but below the decomposition temperature of the solid organic blowing agent. A temperature range of from 90° to 140° C. is preferred. Crosslinking may be effected continuously or batchwise, for example between two heated steel plates or two rollers heated from one side, or in a hot air tunnel or in a heating bath containing an inert fluid, e.g. silicone oil. Conventional infrared radiators may also be used successfully, provided the radiation density is kept sufficiently low to prevent decomposition of the blowing agents.

The most advantageous crosslinking time for each individual case depends on the nature of the peroxide and of the activator, and on the temperature which prevails in the crosslinking device. Experience has shown that this time may be from 3 to 30 minutes, and that in most cases residence times of from 3 to 10 minutes suffice for adequate crosslinking. At this stage, crosslinking has reached the point where the olefin polymers have gel contents (determined in boiling toluene) of from 20 to 60% by weight. They are no longer thermoplastically processable but give stable foams when expanded. The crosslinked, foamable moldings obtained by the process according to the invention can be expanded by all conventional foaming processes. For example, sheets can be foamed by heating them whilst they are floating on a heating bath. Alternatively, hot air may be used as the energy transfer medium. In this latter case, it has proved advantageous to use supports consisting of wire mesh, perforated steel belts, teflon belts or glass fiber fabrics, on which the foamable moldings lie whilst being conveyed through a hot air tunnel, where they are foamed.

In a preferred embodiment, the crosslinked foamable moldings are heated by direct heat radiation, which may be generated by infrared radiators of conventional construction. Typical infrared radiators are Silite rods, quartz tube radiators or electrical resistance wire radiators. Radiators which provide a broad energy distribution extending very far into the longwave region are preferred. It is also advantageous if the energy density distribution is very homogeneous even at a very short distance from the radiator. These requirements are best met by ceramic dark radiators.

The temperature at which foaming is carried out depends on the decomposition temperature of the blowing agent and is in general from 150° to 220° C. The foams obtained have densities of from 25 to 100 g/l.

In the Examples, parts and percentages are by weight.

EXAMPLE 1

Description of the crosslinking step essential to the invention.

40 grams of a mixture of 85 parts of LD polyethylene of density 0.92 (g/ml) and melt index (190/2.16 kg)=2(g/10 min), 15 parts of azodicarboxamide and 3 parts of zinc stearate are kneaded in a Brabender measuring kneader, with mechanical torque indicator, at 30 rpm until the indicator shows a constant torque. The initial torque was 0.153 Nm. 0.35 g of tert.-butyl perisononate is added to the mixture whilst continuing the kneading, whereupon the torque assumes a slightly lower value and remains constant for an indefinite period. If now 200 microliters of an 0.2% strength solution of cobalt naphthenate in n-octane are added, corresponding to $8.2 \times 10^{-4}\%$ of cobalt (based on the amount of polyethylene introduced), the torque rises, after a short induction period of about 30 seconds, to a value of 0.235 Nm in the course of 3 minutes. Because of the start of the crosslinking reaction, it is found that the thermoplastic melt, which at the start of the addition of the cobalt naphthenate solution was still smooth and flowed well, is increasingly converted to an irregular granular mass. Towards the end of the experiment, the mass has substantially lost its flow; it can then no longer be processed thermoplastically.

EXAMPLE 2

40 grams of a mixture of 85 parts of polyethylene, 15 parts of azodicarboxamide and 3 parts of zinc stearate are kneaded in a measuring kneader of the above type at 130° C. until a homogeneous melt is obtained. 0.33 g of tert.-butyl perisononate, corresponding to 1.0% based on the weight of the thermoplastic, is added and worked into the melt for about 3 minutes. The crosslinking reaction is then initiated by adding 0.15 ml of an 0.2% strength solution of cobalt naphthenate in n-octane. After kneading for 1 minute, the plastic mass is molded for 5 minutes in a platen press at 130° C. to give a 2 mm thick blank, the crosslinking being completed during molding. The blank is then chilled in cold water. The product is a foamable structure which expands, in an infrared radiation field of 0.5 watt per square centimeter, to give a 6 mm thick foam having a uniformly fine cell structure. The gel content (insoluble in boiling toluene) of the comminuted foam sheet was from 33 to 36%. The density of the foam, determined by liquid displacement, was 0.031 g/ml, whilst the mean cell diameter was found to be 0.3 mm.

EXAMPLE 2a(COMPARATIVE EXAMPLE)

The experiment described in Example 2 above was repeated and the kneaded mass was transferred, under strictly comparable conditions but without addition of cobalt activator, into the heated platen press and was then crosslinked for 15 minutes at 130° C. On heating under an infrared radiator, the molded sheet obtained melted to form a blistered mass, without expanding to give a foam. The caked melt obtained as the final product proved to be completely soluble in boiling toluene.

EXAMPLE 3

40 grams of a mixture of 80 parts of polyethylene, 5 parts of polybutadiene (predominantly containing cis-1,4-polymerized monomer units and having a Mooney viscosity of 30), 15 parts of azodicarboxamide and 0.5 part of zinc oxide are mixed in a paddle kneader at 145° C. for five minutes to give a viscous mass, after which 0.25 part of tert.-butyl perbenzoate is added and worked in. The kneaded mass is then cooled to 130° C. and 0.10 ml of a 1% strength solution of copper naphthenate in n-octane is added and mixed in for 90 seconds.

The kneaded mass is then transferred into a platen press at 130° C., where it is molded to a 2 mm thick sheet and crosslinked at the same temperature. The resulting foamable blank is suspended in a heating zone, formed by a pair of facing infrared radiators and providing a heat output of 0.6 watt per square centimeter; the sheet expands to give an elastic foam sheet which has a thickness of 5 mm and contains uniformly fine cells of 0.1 mm diameter. The density of the foam, measured by liquid displacement, was 0.035 g/ml, and the proportion of material insoluble in boiling toluene was 54% by weight.

EXAMPLE 4

A mixture of 412 g of an ethylene/vinyl acetate copolymer (which contains 12% by weight of copolymerized vinyl acetate units, and has a density of 0.93 and a melt index (190/2.16 kg) of 4 (g/10 min)), 73 g of azoidicarboxamide, 7.5 g. of zinc stearate and 2.5 g of diallyl phthalate is homogenized for about 7 minutes at 130° C. in a sigma blade kneader having a capacity of 1,000 ml. 5 g of tert.-butyl perbenzoate are added to the thermoplastic melt, in the above state, and are worked in for about 2 minutes. The crosslinking is then initiated by adding 1.25 ml of a 1% strength solution of iron naphthenate in n-octane, this solution being worked into the mixture in the kneader for 90 seconds, after which the kneaded mass is calendered on a roll mill at 140° C. to give a 2 mm thick sheet; the initial sticking of the sheet to the rolls can be suppressed by dusting the rolls with talc. The resulting elongate sheet, having irregular sides but uniformly smooth surfaces, is pulled off the rolls and has, in this condition, already undergone sufficient initial crosslinking that the crosslinking can be completed, without significant change in dimensions of the sheet, by dipping the latter into a bath of silicone oil at 130° C. After about 10 minutes, the foamable blank is taken from the silicone bath, freed mechanically from adhering oil and passed, whilst still hot and in a freely suspended manner, upwards through a vertical heating tunnel consisting of a plurality of infrared radiators with their radiant surfaces facing one another. The radiation density incident on each of the main faces of the blank is 0.6 watt per square centimeter. Within 2 minutes, the blowing agent decomposes and the blank commences to expand in all three spatial directions, and after a further minute the finished foam web can be taken from the oven and cooled. When the resulting foam has cooled, it exhibits properties resembling foam rubber and has a uniform cell structure of medium fineness, the mean cell diameter being from 0.5 to 0.6 mm.

Determination of the crosslinking density showed that after eight hours' extraction of the comminuted foam in boiling toluene the insoluble gel content was 53% by weight, based on the initial weight of the foam.

EXAMPLE 5

A mixture of 27.3 grams of high pressure polyethylene, having a density of 0.92 g/ml, and 5.85 grams of a random ethylene-propylene copolymer, having a density of 0.90 and a Mooney viscosity of 10, is kneaded in a laboratory measuring kneader at from 165° to 170° until a homogeneous melt is produced. The temperature of the plastic mass is then reduced to 145° and 5.85 grams of azodicarboxamide are introduced into the melt. After homogenizing for 5 minutes with the rolls rotating at 30 rpm, 0.20 gram of zinc oxide is introduced into the mixture and when this has been dispersed adequately, 2 grams of 3,3,5-trimethylcyclohexanone perketal, as a 40% strength mixture on silica gel, are introduced and homogeneously kneaded into the composition. Crosslinking is initiated by introducing 40 milligrams of a finely dispersed mixture of 1 part by weight of cobalt stearate in 50 parts by weight of silica gel, and after 60 seconds the kneaded mass is crosslinked for 10 minutes in a platen press at 145° C. The blank obtained can be foamed by means of infrared radiators to give a very flexible, soft foam sheet having a pure white appearance and possessing uniformly fine cells.

EXAMPLE 6

A homogenized and granulated premix consisting of 85 parts of high pressure polyethylene, 15 parts of azodicarboxamide and 3 parts of zinc stearate is coated cold, in a high-speed mixer, with a power of 1 part of copper stearate and 99 parts of silica gel, in the presence of 1% of paraffin oil (based on the weight of granules). The resulting precompounded granules are then melted and homogenized in an extruder having a length of 25 D (D=19 mm), at a throughput of 0.9 kg per hour. The screw employed had a special mixing zone of length 5 D at the screw tip. About 300 microliters of liquid tert.-butyl perbenzoate were metered, by means of a micrometering device, into the plasticized melt just before the latter reached the mixing zone. At this point, the temperature of the thermoplastic melt was 136° C. The mixing zone in which the peroxide was worked into the melt was cooled by means of compressed air to avoid decomposing the peroxide by shearing energy. The extruder head was fitted with a sheet die by means of which the as yet incompletely crosslinked gel was molded into a sheet about 100 mm wide and 1.4 mm thick, the molding temperature being 130° C. The continuous sheet web was drawn off by means of a roller system and transported through a bath of silicone oil at 140° C., the residence time in the bath being 6.5 minutes. The crosslinked blank was easily freed from adhering oil, and cooled at the same time, by means of compressed air brushes. The finished blank was wound up, for subsequent use.

The blank was foamed by means of a vertical tunnel of a plurality of flat infrared radiators facing one another at a distance of 250 mm. The tunnel was 1,000 mm long. The blank was introduced into the top of the tunnel by means of a pair of rollers and the finished foam web was taken off at the bottom of the tunnel by means of another pair of rollers, the ratio of the speed of travel of the upper pair to that of the lower pair being about 1:3. The energy density, measured in the zone where the blank was foamed, was 0.55 watt/cm$^2$. The blank foams in the course of 2.5 minutes to give a pure white foam web which is 280 mm wide and 4.5 mm thick and has a uniformly fine cell structure. The mean cell size is 0.4 mm and the gel content (insoluble in boiling toluene) is 38% by weight.

EXAMPLE 7

1% of a mixture of 49 parts of silica gel and one part of manganese palmitate is applied by tumbling, using 1% of mineral oil (as an adhesion promoter), to a homogeneous granular mixture of 85 parts of high pressure polyethylene, 15 parts of azodicarboxamide and 3 parts of zinc stearate. The resulting precompounded granules are then melted and homogenized in an extruder having a length of 25 D (D=19 mm), at a throughout of 0.9 kg per hour. At the beginning of the mixing zone, about 5 D before the sheet die, a solution of 40 parts of technical-grade cumene hydroperoxide (about 80% pure) in 60 parts of n-octane is metered into the melt, by means of a micro-metering device, under a pressure of 50 bars and at a rate of 900 microliters per minute. The melt temperature at the metering point was 135° C., and no further heat energy was supplied along the mixing zone. The thermoplastic melt was shaped, by means of a sheet die, into a continuous web 90 mm wide and 1.6 mm thick, which was drawn off by means of a roller system and passed through a bath of silicone oil heated to 145° C. After a residence time of about 8 minutes in the bath, the crosslinked blank was freed from adhering oil by means of an air brush, and at the same time cooled below the softening point. The blank obtained was easily foamed, by means of the foaming installation described in Example 3, to give a continuous foam web about 5.2 mm thick and 260 mm wide. In addition to a uniformly fine cell structure, the web exhibited some pores, presumably attributable to vaporization of the incompletely admixed n-octane.

EXAMPLE 8

If the above experiment is repeated with the coated granules from Example 7, but applying 2% of technical-grade cumene hydroperoxide (about 80% pure) instead of the activator, and metering a solution of 50 grams of copper versatate in 95 grams of o-xylene, at a rate of 250 microliters per minute, into the melt before reaching the mixing zone, the throughput of thermoplastic being 900 g per hour, the foam obtained after forming a web, curing in the silicone bath at 140° C. and expanding, is similar to that obtained in Example 7, but free from the larger cavities. The mean cell diameter is 0.5 mm. The gel content (determined in boiling toluene) is about 35%.

We claim:
1. A process for the manufacture of a crosslinked, foamable molding from an olefin polymer by
   A. mixing a thermoplastic olefin polymer with
      (a) from 1 to 20% by weight, based on the olefin polymer, of a solid organic blowing agent which eliminates an inorganic gas of heating, and
      (b) from 0.25 to 5% by weight, based on the olefin polymer of an organic peroxide having a half-life temperature above 90° C., with or without
      (c) from 0.1 to 10% by weight, based on the olefin polymer of zinc oxide or zinc stearate as a foaming assistant, an organic compound which contains 2 or more olefinically unsaturated double bonds as a crosslinking promoter and/or one or more other additives, at above the softening point of the olefin polymer but below the decomposition temperature of the blowing agent and peroxide,
   B. converting the mixture, in the thermoplastic state, to the desired shape, and
   C. crosslinking the mixture at below the decomposition temperature of the blowing agent, but above the decomposition temperature of the activated peroxide.
   wherein, in stage A,
      (d) from 0.00001 to 1% by weight, based on the olefin polymer, of an activating organic compound which lowers the decomposition temperature of the peroxide is also admixed with the olefin polymer, said activating organic compound being a transition metal salt of a long-chain aliphatic or aromatic fatty acid in which the transition metal is selected from the group consisting of copper, vanadium, chromium, manganese, iron, cobalt and nickel.

2. A process as set forth in claim 1, wherein the olefin polymer, blowing agent and peroxide are premixed and homogenized and the activator is only added shortly before the molding stage B.

3. A process as set forth in claim 1, wherein the olefin polymer, blowing agent and activator are premixed and homogenized and the peroxide is only added shortly before the molding stage B.

4. A process as set forth in claim 1, wherein the mixing in stage A and the molding in stage B are carried out at from 110° to 150° C.

5. A process as set forth in claim 1, wherein the molding in stage B is carried out by pressing, calendering or extruding the thermoplastic mixture.

6. A process as set forth in claim 1, wherein the thermoplastic mixture is molded, in stage B, to give a sheet, film or strand which is from 0.8 to 10 mm thick.

7. A process as set forth in claim 1, wherein process step B is carried out in from 0.5 to 20 minutes.

8. A process as set forth in claim 1, wherein the crosslinking of the molding in stage C is carried out between heated molding tools, in a hot fluid bath, in hot air or by means of an infrared radiator.

9. A process as set forth in claim 1, wherein the crosslinking in stage C is carried out at from 90° to 140° C.

10. A process as set forth in claim 1, wherein process step C is carried out in from 3 to 30 minutes.

11. A process as set forth in claim 1, wherein the crosslinking results in a gel content of the olefin polymer of from 20 to 60%.

12. A process as set forth in claim 1, wherein polyethylene is used as the olefin polymer.

13. A process as set forth in claim 1, wherein azodicarboxamide is used as the organic blowing agent.

14. A process as set forth in claim 1, wherein tert.-butyl perisononate, tert.-butyl perbenzoate, dicumyl peroxide or cumene hydroperoxide is used as the peroxide.

15. A process as set forth in claim 1, wherein from 0.5 to 3% by weight, based on the olefin polymer, or zinc oxide or zinc stearate is added as foaming assistant.

16. A process as set forth in claim 1, wherein from 0.2 to 5% by weight, based on the olefin polymer, of an organic compound which contains 2 or more olefinically unsaturated double bonds, is added as crosslinking promoter.

17. A process as set forth in claim 1, wherein the activating organic compound is admixed in the form of a mixture with an inert, finely divided filler.

* * * * *